VARIABLE BEAM ELECTRON GUN

Original Filed Nov. 20, 1958 3 Sheets-Sheet 1

INVENTOR.
ARIE L. EICHENBAUM
BY
L A Larsen
ATTORNEY

INVENTOR:
ARIE L. EICHENBAUM
BY
L A Larsen
ATTORNEY

INVENTOR.
ARIE L. EICHENBAUM
BY
L A Larsen
ATTORNEY

United States Patent Office

Re. 25,222
Reissued Aug. 14, 1962

25,222

VARIABLE BEAM ELECTRON GUN

Arie L. Eichenbaum, Levittown, Pa., assignor to Radio Corporation of America, a corporation of Delaware Original No. 2,996,640, dated Aug. 15, 1961, Ser. No. 775,195, Nov. 20, 1958. Application for reissue Feb. 26, 1962, Ser. No. 176,500
9 Claims. (Cl. 315—15)

Matter enclosed in heavy brackets [ ] appears in the original patent but forms no part of this reissue specification; matter printed in italics indicates the additions made by reissue.

This invention relates to electron guns, and particularly to a novel and improved means for controlling the trajectory and shape of high density electron beams.

High density electron beam-type amplifiers and oscillators generally require electron guns which provide electron beams having uniform density, laminar rectilinear flow, and a prescribed divergence or convergence angle. As presently known, most electron beam-type microwave amplifiers, such as the traveling wave tube and the klystron, employ a Pierce type of electron gun. The Pierce type electron gun uses shaped electrodes having a specified geometry to control the flow and focusing of the electrons in the tube thus producing a uniform rectilinear electron flow. According to the Pierce principle, an ideal electrode arrangement provides a zero equipotential surface disposed at approximately a 67½° angle with respect to the normal to the cathode emitting surface at the periphery thereof. (Refer to "Vacuum Tubes" by K. R. Spangenberg, 1948, pages 450–458.) The predetermination of the electrode arrangement in the electron gun generally fixes the shape of the electron beam so that the beam is initially convergent or divergent at a fixed angle.

It is desirable to have an electron gun which allows simple control external to the electron tube for shaping an electron beam. An external adjustable control to vary the initial divergence or convergence of an electron beam may also be advantageous in reducing the noise figure of an electron tube.

An object of this invention is to provide a novel and improved electrode configuration for an electron gun.

Another object of this invention is to provide an improved electron gun having a control external to the electron tube which can vary the initial divergence or convergence of the electron beam.

Another object is to effect a reduction in the noise figure of an electron tube.

According to the invention, a beam-focusing electrode is positioned between the conventional beam-forming and accelerating electrodes of a Pierce-type electron gun. The configuration of the electrodes is such that when the voltage of the beam-focusing electrode is varied, the initial angle of divergence or convergence of the electron beam is controllably changed. Means external to the electron tube are provided for adjusting the voltage of the beam focusing electrode thus affording a convenient control for modifying the shape of the electron beam.

The invention will be described in greater detail with reference to the drawing wherein.

Figure 1:
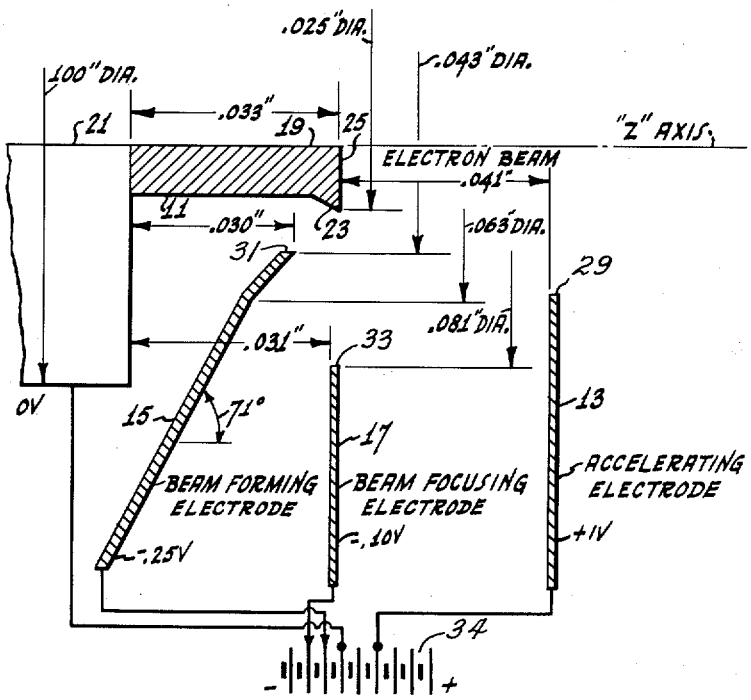
FIG. 1 is a transverse sectional view of an electron gun according to the invention, but in half, showing the configuration of electrodes required for an electron beam which may be varied from 10° convergent to 20° divergent.
Figure 5:
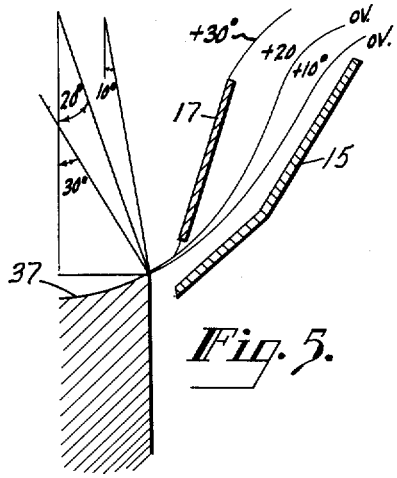
Figure 6:
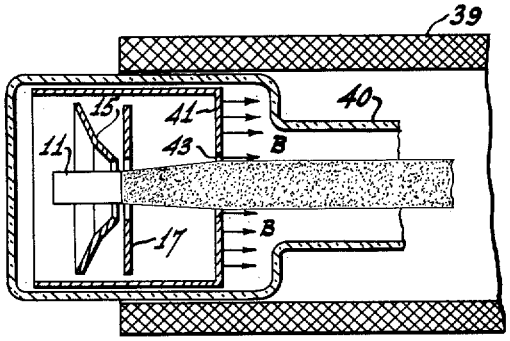
Figure 7:
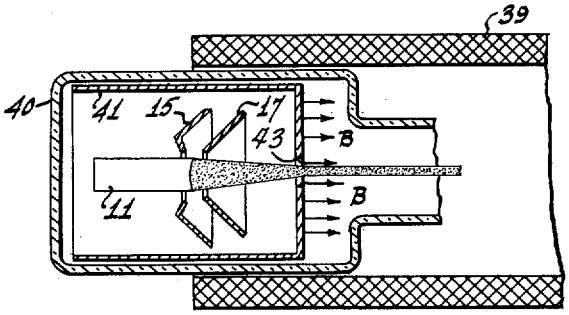

FIG. 5 is a transverse sectional view of an electron gun, cut in half, showing the configuration of electrodes required for an electron beam which may be varied from 10° convergent to 30° convergent; and FIGS. 6 and 7 are partial sectional views of electron tubes positioned in a magnetic field and incorporating electron guns similar to those illustrated in FIGS. 1 and 5, respectively.

Similar elements are indicated by similar reference characters throughout the drawing.

An embodiment of this invention is shown in FIG. 1, in half section, wherein an electron gun comprises a cathode electrode 11, an accelerating electrode 13, a beam-forming electrode 15, and a beam-focusing electrode 17. The various elements of the electron gun structure are supported as a unit within a tube envelope. The cathode 11 consists of a narrow cylindrical portion 19 joined with a broader cylindrical portion 21, the narrow portion 19 being solid whereas the broad portion 21 is hollow. The solid cylindrical cathode portion 19 flares outwardly at one end to form a frustoconical portion 23 having as a base a transverse surface which is coated with a thermionic emitting material to provide a cathode emitting face 25. The emitting face 25 lies in a plane substantially perpendicular to the longitudinal axis of the cathode 11, hereinafter designated the Z axis. A heater filament (not shown) is positioned within the hollow cylindrical section 21 for supplying heat to the cathode 11 to cause emission of electrons from the cathode emitting face 25. During operation of the tube, a high density electron beam which may be initially convergent or divergent is projected along the Z axis from the emitting face 25.

The accelerating electrode 13 is an annular electrode in the form of a disk having a centrally located aperture 29, which is larger in area than the mitting face 25, to allow passage of the electrons emitted from the cathode face 25. The accelerating electrode 13 is spaced from the emitting face 25, preferably at a distance greater than the diameter or width of the face 25, along the Z axis in the direction of electron beam, and is mounted concentric to the Z axis. The position and the voltage of the accelerating electrode 13 are factors in determining the shape of the electron beam and the total current drawn.

Fixed closely adjacent to the narrow portion 19 of the cathode 11 is the beam-forming electrode 15 which is generally conical, in the example shown in FIG. 1, and has a relatively small central aperture 31. The electrode 15 is so positioned that its aperture 31 is *close to but* spaced behind the cathode face 25, as shown in FIG. 1. The beam-forming electrode 15 is shaped in such a manner as to produce a required zero potential surface adjacent to the cathode emitting face 25.

According to this invention, a beam focusing electrode 17 having a relatively large aperture 33 is mounted coaxially with and intermediate the accelerating electrode 13 and the beam-forming electrode 15. The beam-focusing electrode 17 is preferably an annular disk which is positioned substantially in the plane of the cathode emitting face 25. Small changes of voltage applied to the electrode 17 shifts the zero equipotential surface substantially thus varying the electron beam shape.

A source of direct current voltage 34 provides suitable potentials to each of the electrodes. In the preferred embodiment of the invention, the cathode 11 and the accelerating electrode are maintained at constant voltages, whereas the voltage applied to the beam-forming electrode 15 and beam-focusing electrode 17 may be varied.

Figure 2:
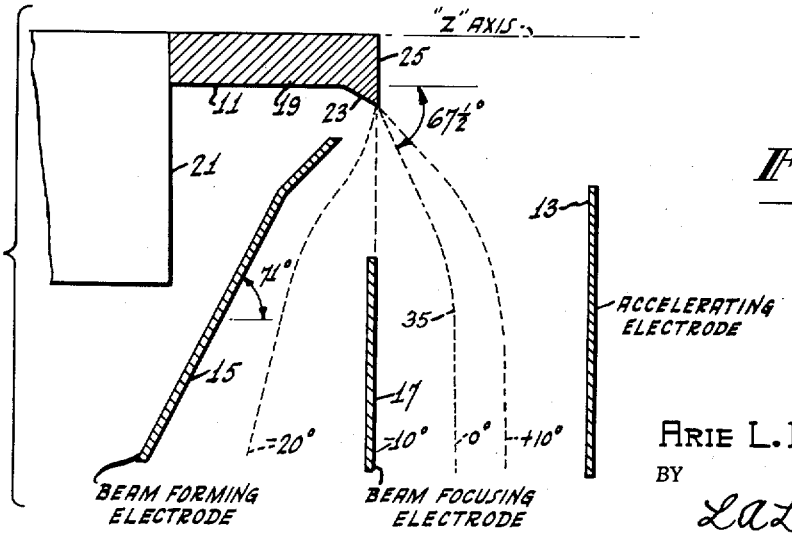
FIG. 2 is a transverse sectional view of an electron gun, cut in half, showing the same configuration of electrodes as in FIG. 1, including zero equipotential surfaces for several convergence-divergence angles as measured in an electrolytic tank.

In FIG. 2 there are shown geometrical relationships of various zero potential surfaces for corresponding convergence-divergence angles of the electron beam that were determined by measurements made in an electrolytic tank, which method is well known in the art. Thus, for a parallel rectilinear beam having a zero convergence-divergence angle, a zero equipotential surface 35 forms a 67½° angle relative to the Z axis within a beam radius from the periphery of the cathode emitting surface 25. With the electrode configuration illustrated, measurements indicate that at distances of about 3 beam radii from the periphery of the cathode face 25, the zero equipotential surface 35 for zero convergence-divergence becomes arcuate and defines a larger angle than 67½° with respect to the Z axis.

The geometrical arrangement of the electrodes shown in FIGS. 1 and 2 creates zero equipotential surfaces corresponding to electron beam angles of convergence-divergence between 20° divergence and 10° convergence depending upon the potentials of the beam-forming electrode 15 and the beam-focusing electrode 17. As illustrated in FIG. 2, the zero equipotential surface for a 20° divergent beam is represented by the line denoted as −20°. The beam-focusing electrode 17, in this embodiment of electron gun shown by way of example, is located close to the zero potential surface for an electron beam having a 10° divergent flow denoted as −10°. It is understood that the beam-focusing electrode 17 may be positioned along any other equipotential surface provided that it is located in the approximate center of the desired convergence-divergence range, for example, from 0° divergence to 10° convergent as shown in FIG. 2. The zero equipotential surface for a 10° convergent beam is denoted as +10° in FIG. 2.

Figure 3:
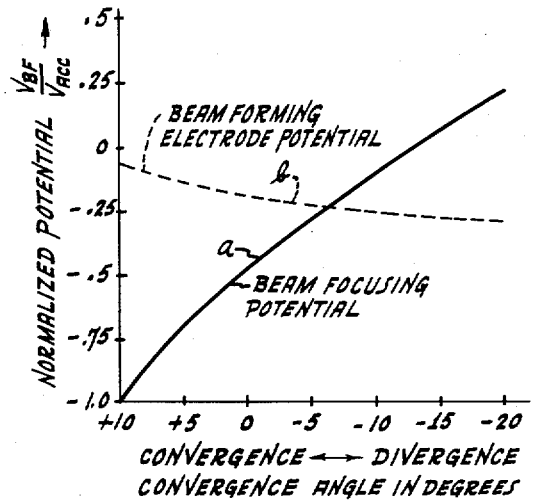
FIGS. 3 and 4 are graphs including curves indicating the voltages applied to the beam-forming and beam-focusing electrodes of the electron gun to produce a particular convergence-divergence angle of the electron beam.

The graph of FIG. 3 illustrates the voltages which are applied to the beam-forming electrode 15 and beam-focusing electrode 17 of the configuration of FIGS. 1 and 2 to produce a beam within the range of 10° convergence to 20° divergence, when the cathode is maintained at zero potential. In the example shown in FIG. 1, with a voltage on the accelerating electrode 13 of one volt positive with respect to the cathode, the beam-focusing electrode 17 is set at about .10 volt negative relative to ground, and the beam-forming electrode is set at approximately .25 volt negative relative to ground to produce a beam having a 10° divergence angle. The ordinate values of the graph of FIG. 3 represent normalized potentials.

$$\frac{V_{BF}}{V_{ACC}}$$

where for a given angle of convergence-divergence, $V_{BF}$ is the voltage applied to the beam-forming electrode 15 as indicated by a curve a, $V_{BF}$ is also the voltage applied to the beam-focusing electrode 17 as read on curve b, and $V_{ACC}$ is the voltage of the accelerating electrode 13. Thus, any change in the accelerating electrode voltage requires a proportional change in the beam electrodes 15 and 17 for the same electron beam flow angle.

It is noted that the voltage applied to to the beam-forming electrode 15 is varied to a smaller degree in relation to the changes in potential applied to the beam-focusing electrode 17. While holding the beam-forming electrode

Figure 4:
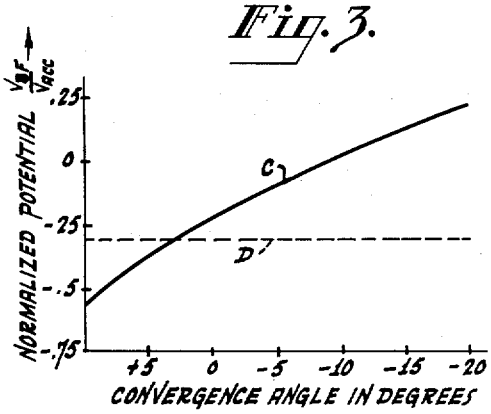

15 at a constant potential of about .30 volt negative relative to the cathode, measurements made with the electrolytic tank indicate that variations in potential from about .53 volt negative to about .22 volt positive applied to the beam-focusing electrode 17 change the angle of the electron beam from 10° convergent to 20° divergent as shown by curves c and d in FIG. 4.

Other combinations of electrodes and applied potentials may be used for different desired ranges of electron beam convergence-divergence. As an example, a configuration of electrodes such as disclosed in FIG. 5 may be employed, wherein the cathode emitting surface 37 is concave and aids in converging the electron beam, to produce a high density electron beam in the range of 10° to 30° convergence. The beam-focusing electrode 17 and the beam-forming electrode 15 *have their apertures close to the plane of the emitting surface, as in FIGS. 1 and 2, but* are set at smaller angles relative to the [Z] *longitudinal* axis than in the arrangement of electrodes *shown in FIGS. 1 and 2* for the case of 10° convergence to 20° divergence. [However, in every application of the invention] *Moreover, as shown in FIG. 5,* the zero [potential] *equipotential* surface for a [particular electron] beam angle of *10°* convergence [-divergence] is located between the beam-forming electrode 15 and the beam-focusing electrode 17, *instead of between electrodes 13 and 17 as in FIG. 2.*

To provide an electron gun having a maximum divergence angle greater than 20°, the beam-forming electrode 15 is located further away from the beam-focusing electrode 17. If a greater convergence angle than 10° is required, the beam-focusing electrode 17 may be located along the 0° or 5° convergence zero potential surface. A total range of 40° divergence to 10° convergence may then be covered with an electron gun, according to the invention, by the simple adjustment of the potentials of the beam-forming electrode 15 and the beam-focusing electrode 17. By the use of a gun structure that produces a beam that is divergent in the region near the cathode 11, the noise figure of the tube is substantially reduced.

In microwave beam tubes, the beam from a magnetically shielded Pierce type gun normally enters a strong axial magnetic field near a point where the radius of the beam is a minimum, so that magnetic focusing forces largely determine the beam's subsequent behavior. The initial formation of the electron beam is determined principally by the electric fields which are established according to the shapes, potentials, and arrangement of the gun electrodes.

When the electrons of a beam which enter the magnetic focusing field have a transverse velocity component, the Brillouin flow is affected and a poorly formed, scalloped beam may result. The Brillouin flow is defined as a magnetically focused electron stream in which all electrons are considered to be rotating in circles concentric with the axis with uniform angular velocity and have the same axial component of velocity. Forces acting on electrons are in balance at all radii. However, a random transverse electron velocity distribution in the beam results in a flow condition differing appreciably from this ideal picture, and the scalloping effect occurs.

The electrode configurations described herein afford the advantage of providing proper Brillouin flow when utilized in an electron tube which is positioned in a magnetic field. In each of FIGS. 6 and 7, a magnetic field is shown provided by an external magnetic coil 39 surrounding a tube envelope 40. The gun comprises an accelerating electrode 41 in the form of a cylindrical cup of magnetic material having a central aperture 43. The cup 41 encloses the cathode 11, the beam-forming electrode 15 and beam-focusing electrode 17 to serve as a magnetic shield therefor. The fringing magnetic field B produced by the coil 39 in the aperture 43 deflects the electrons which pass through the aperture 43 of the accelerating electrode 41 into spiral paths to produce a constant diameter beam with Brillouin flow.

A feature of this embodiment incorporating the invention is that the location of the magnetic shield or accelerating electrode 41 is not critical because the plane of minimum beam diameter may be shifted by varying the potentials of the beam-forming electrode 15 and the beam-focusing electrode 17, *the apertures of which are close to the plane of the emissive surface of cathode 11, as in the other embodiments of the invention.* Also, by employing the desired gun design and potentials, proper boundary conditions along the edge of the beam at the cathode are established resulting in uniform emission and a well-collimated beam. Since the electrons of the beam arrive at the aperture of the accelerating electrode with a small radial velocity as a result of the adjusted flow angle, a laminar flow of electrons with a uniform current density over the cross section of the electron beam is provided upon entry into the magnetic field B causing a consequent reduction in scalloping. Also, since there is a laminar rectilinear flow of electrons towards the target, a magnetic field of lower intensity is required for focusing. Therefore, a smaller magnet of less weight and requiring less power may be employed to provide a weaker magnetic field.

It is understood that the invention is not limited to the geometries of the electrodes shown by way of example, but is applicable to various combinations of electrodes employed in an electron gun which includes a beam-forming electrode with an aperture located behind a cathode emitting face and a beam-focusing electrode having an aperture [substanitally in] *close to* the plane of the cathode emitting surface with means external to the tube for varying the potential of the beam-focusing electrode.

What is claimed is:

1. An electron gun for producing and shaping an electron beam comprising a cathode having an electron emitting surface with a predetermined width, a beam-forming electrode and a beam-focusing electrode, said electrodes each having a single aperture in a plane located adjacent to said emitting surface at a distance from said surface less than one half of said width, and terminal means for applying different variable voltages to said electrodes to vary the convergence-divergence angle of the beam.

2. An electron gun contained within an electron tube for projecting a variable-shape electron beam along a predetermined axis comprising a cathode having an emissive surface, a plurality of spaced apertured electrodes including a beam-forming electrode, a beam-focusing electrode and an accelerating electrode coaxially mounted relative to said axis and spaced from said emissive surface, the aperture of said beam-focusing electrode being substantially in the plane of said emissive surface and positioned between the other two of said apertured electrodes, and terminal means external to said tube for applying different potentials to said electrodes, and means for varying the potential applied to said beam-forming and beam-focusing electrodes to vary the convergence-divergence angle of said electron beam.

3. An electron gun for projecting an electron beam comprising a cathode electrode having an emitting face, a beam-forming electrode having an aperture therein, a beam-focusing electrode having an aperture therein, the planes of said apertures being spaced from said cathode emitting face at distances less than one half of the width of said emitting face, an accelerating electrode positioned in front of and spaced from said cathode face at a distance greater than said width, means for applying different potentials to said electrodes, and means for separately varying the potentials of the beam-forming and beam-focusing electrodes to vary the convergence-divergence angle of the electron beam.

4. An electron gun in an electron tube for producing a high density electron beam comprising a cathode electrode having an emitting face, an accelerating electrode spaced from and in front of said emitting face, a beam-forming electrode disposed behind said emitting face, a beam-focusing electrode positioned between said accelerating and beam-forming electrodes, means for applying potentials to said electrodes, and means external to said tube for varying the potential applied to said beam-focusing electrode whereby the angle of convergence or divergence of said electron beam is changed.

5. An electron gun for providing an electron beam comprising a cathode electrode having an emitting face for producing an electron beam, a beam-forming electrode having an aperture closely spaced from and disposed behind said cathode emitting face, an accelerating electrode disk positioned in front of said cathode emitting face having an aperture larger in diameter than said beam-forming electrode aperture, a beam-focusing electrode positioned between said beam-forming and accelerating electrodes and having an aperture substantially in the plane of said emitting face, means for applying voltages to said electrodes, and means for varying the voltage applied to said beam-focusing electrode whereby the convergence-divergence angle of said electron beam is varied.

6. An electron gun for projecting a variable-shape electron beam along a predetermined axis comprising a cathode having an emissive surface transverse to said axis, an apertured accelerating electrode spaced from said cathode, an annular beam-forming electrode having an aperture, an annular beam-focusing electrode between said accelerating electrode and said beam-forming electrode and lying substantially in the transverse plane of said emissive surface, whereby said gun can be controlled to provide either convergent, divergent or parallel flow in the region between said cathode and said accelerating electrode by the application of suitable voltages to said beam-forming and said beam-focusing electrodes.

7. An electron gun for producing an electron beam comprising a cathode electrode having an emissive surface of approximately .025 inch diameter, the longitudinal axis of said cathode electrode passing through the approximate center of said surface at a normal to the plane of said surface, an accelerating electrode having an aperture spaced in front of said emissive surface at a distance of about .041 inch, a beam-forming electrode having an aperture surrounding said cathode, the plane of said beam-forming electrode aperture parallel to and spaced from said emissive surface at about .003 inch, a beam-focusing electrode disposed between said accelerating electrode and said beam-forming electrode having an aperture, the plane of said beam-focusing electrode aperture positioned substantially in the plane of said emissive surface, means for applying voltages to said electrodes, and means to vary the voltages of the beam-forming and beam-focusing electrodes thereby changing the shape of said electron beam.

8. A variable shape electron beam producing device comprising an electron gun having a cathode electrode with an electron emitting surface, a plurality of electrodes having apertures spaced closely from said cathode emitting surface, means for applying variable potentials to said plurality of electrodes, to vary the convergence-divergence angle of the beam, a cup-shaped accelerating electrode of magnetic material magnetically shielding said electrodes and having an aperture aligned with said first named apertures, and means for providing a magnetic field along the axis of said device for producing a uniform diameter electron beam having Brillouin flow in the region beyond the aperture in said cup-shaped electrode.

9. An electron gun for projecting a variable-shape electron beam along a predetermined axis comprising a cathode having an emissive surface transverse to said axis, an apertured accelerating electrode spaced from and in front of said cathode, an annular beam-forming electrode, and an annular beam-focusing electrode between said accelerating electrode and said beam-forming electrode, the apertures in said annular beam-forming and beam-focusing electrodes being disposed close to the plane of said emissive surface, whereby said gun can be controlled to produce various degrees of convergence or divergence, or parallel flow, in the region between said cathode and said accelerating electrode by the application of suitable potentials to said beam-forming and beam-focusing electrodes.

References Cited in the file of this patent or the original patent

UNITED STATES PATENTS 2,094,606 Knoll ---------- Oct. 5, 1937

2,268,197 Pierce ---------- Dec. 30, 1941
2,323,986 Flory ---------- July 13, 1943
2,400,753 Haeff ---------- May 21, 1946
2,452,619 Weimer ---------- Nov. 2, 1948
2,567,674 Linder ---------- Sept. 11, 1951
2,800,602 Field ---------- July 23, 1957
2,811,667 Brewer ---------- Oct. 29, 1957